United States Patent [19]

Tomisaburo

[11] 3,786,319

[45] Jan. 15, 1974

[54] INSULATED-GATE FIELD-EFFECT TRANSISTOR

[75] Inventor: Okumura Tomisaburo, Kyoto, Japan

[73] Assignee: Matsushita Electronics Corporation, Osaka, Japan

[22] Filed: Mar. 20, 1967

[21] Appl. No.: 624,477

[30] Foreign Application Priority Data

Mar. 28, 1966 Japan ............................... 41/19828

[52] U.S. Cl. .......... 317/235 R, 317/235 G, 307/304

[51] Int. Cl. ............................................ H01l 19/00

[58] Field of Search .................. 317/235, 21.1, 22.2; 307/304; 330/38 FE

[56] References Cited

UNITED STATES PATENTS

| | | | |
|---|---|---|---|
| 3,268,827 | 8/1966 | Carlson et al. | 317/235 |
| 3,406,298 | 10/1968 | Axelrod | 317/235 |
| 3,436,622 | 4/1969 | Warner | 317/235 |
| 3,339,128 | 8/1967 | Olmstead | 317/235 |

OTHER PUBLICATIONS

IBM Technical Disclosure Bulletin, "An AND Gate Using Single FET" by Brennemann et al., Vol. 7, No. 1, Page 7, June 1964.

*Primary Examiner*—Jerry D. Craig
*Attorney*—Stevens, Davis, Miller & Mosher

[57] ABSTRACT

A multi-polar insulated gate transistor having two or more isolated electrodes formed on an insulated film, and an island region having a conductivity type different from that of the semiconductor proper and located in the portion of the substrate beneath said film and below the gap between said electrodes, whereby a large current can flow through the element located closer to the drain when the respective elements which may consist of the pair, i.e., each gate and source-island, island-island or island-drain are under identical voltage conditions.

7 Claims, 19 Drawing Figures

INSULATED-GATE FIELD-EFFECT TRANSISTOR

The present invention relates to field-effect transistors each having two or more insulated-gates.

Heretofore, a field-effect transistor having one insulated gate has been well known. As an improvement thereof, an insulated-gate field-effect transistor having two or more insulated gates has been developed in recent years. However, if the two or more gates are improperly designed in the latter transistor, they cannot perform their respective functions properly.

It is an object of the present invention to provide an insulated-gate field-effect transistor having two or more gates in which the two or more gates can be effectively operated by providing proper design conditions to the mutual relation between the two or more gates.

According to the present invention, there is provided an insulated-gate field-effect transistor comprising an insulator film on a semiconductor substrate, a source and a drain electrode regions having opposite conductivity type to the main part of said substrate, two or more gate electrodes mutually independently located on said insulator film, and one or more island regions having the same conductivity type as said source and said drain electrode regions but opposite to said main part of said substrate existing directly below respective gaps between said two or more gates and on the underside of said insulating film, said two or more gates being located correspondingly between said source region, drain region, and one or more island regions, respectively, characterized in that each said electrode is formed so that a large current can flow from said source to said drain under the condition that the voltages between said source and neighboring said island, between neighboring said islands, and between said island and said drain are equal.

Other objects and advantages of the present invention will become more apparent from the following detailed description of the invention with reference to the attached drawings, in which:

FIG. 1 exhibits a cross-sectional view of an insulated-gate field-effect transistor embodying the present invention;

FIGS. 2A–2D show various electrode arrangements exemplifying the devices of this invention;

FIGS. 3 through 8 present characteristics diagrams for the devices of this invention;

FIG. 9 gives a plan view of an embodiment of this invention;

Figure 1:
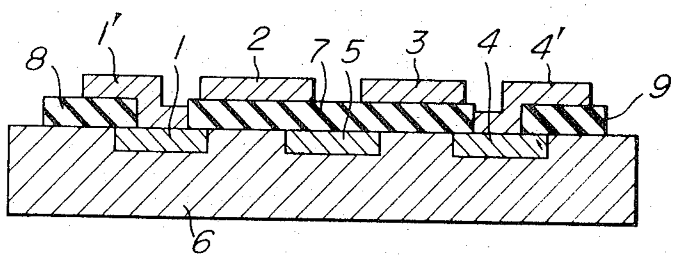

FIG. 1 presents, as an example, a cross-sectional view for the purpose of explaining the principle of the insulated-gate field-effect transistor having double insulated-gates. Referring to FIG. 1, reference numeral 1 stands for a diffused region formed in the upper surface of a semiconductor substrate 6, which has opposite conduction type to the substrate. The diffused region 1 functions as a current inlet electrode, and is called a source. A metal film 1′ serving as an electrode metal is coupled to the region 1, and 2 and 3 are respectively isolated insulated-gate electrodes. A region 4 of the same conductivity type as 1 constitutes a current outlet electrode drain, to which is coupled an electrode metal 4′.

A diffused region 5 of the same conductivity type as the regions 1 and 4 is provided between the source and the drain. This region 5 will be hereinafter referred to as an island. Films 7, 8 and 9 of insulating material such as silicon dioxide and the like, are provided on the substrate. It is possible to expose the upper surface of the island 5 by removing the part of the insulating film 7 just over the island 5, that is, the part lying between the gates. Then, if a metallic film is attached to the island 5 or the exposed island 5, the island 5 can be separately led out as an independent electrode. An ohmic contact provided on the lower surface of the semiconductor substrate 6 may be used independently as an electrode, or connected to the source, in this transistor as in the conventional insulated-gate field-effect transistor. Of the double gates, the gate indicated by 2 is here called a control-gate, and the gate 3 a screen-gate. By using this screen-gate, the electrostatic coupling between the control gate and the drain can be greatly reduced. According to an experiment, in the device shown in FIG. 1, reduction to one several tenth in the electrostatic coupling between the control-gate and drain was possible as compared with that having no screen-gate. In this device, when p-type semiconductor is used as the semiconductor substrate 6, an n-type thin layer develops on the substrate 6 (p-type semiconductor layer) directly beneath the insulating film 7 by the action of a gate voltage, and if a voltage is impressed between the source and drain with the drain positive, electrons flow between the source and drain, through the island. If, on the contrary, an n-type semiconductor is used, positive holes run as the current carrier. The amount of these current carriers is adjustable by the gate voltage, and modifications of the drain current is thereby brought about.

The operation of this transisitor is explained as follows: In the device shown in FIG. 1, 1, 2 and 5 may be regarded as forming an insulated-gate field-effect transistor, and 5, 3 and 4 another insulated-gate field-effect transistor, the first transistor formed by 1, 2 and 5, and the second transistor formed by 5, 3 and 4 being connected in series relationship. In each of these insulated-gate field-effect transistors, each saturated drain current $I_{DS}$ is represented by the following equation:

$$I_{DS} = (C\mu W/2L)\,(V_G - V_P)^2 \qquad (1)$$

provided that $V_D \geq V_G - V_P$, and where $C$ = Electrostatic capacity possessed by the insulating film per unit area $\mu$ = Mobility of the carrier $W$ = Length of the source (represented by the side length of the effective working part of the opposing sides of the source and drain substantially disposed in parallel.)

$L$ = Distance between the source and drain (represented by the distance between the effective working parts of the opposing sides of the source and drain substantially disposed in parallel.)

$V_G$ = Voltage between the gate and source $V_P$ = Pinch-off voltage $V_D$ = Drain voltage In applying the equation (1) to the device shown in FIG. 1, for the first transistor, $W$ is the length of 1, $L$ the distance between 1 and 5, $V_G$ the voltage of 2 relative to 1, and the drain voltage $V_D$ the voltage of 5 relative to 1. This equation (1) may be applied equally well to the second transistor by assuming 5 to be the source, and 4 the drain.

With regard to $I_{DS1}$ of the first transistor and $I_{DS2}$ of the second transistor, if $I_{DS1} > I_{DS2}$, the total drain current is limited by $I_{DS2}$. Similarly, if $I_{DS1} < I_{DS2}$, the total drain current is limited by $I_{DS1}$. Now, if the screen-gate is set at a certain D.C. potential, and, at the same time, is grounded for an A.C. voltage, when an input signal is fed to the control-gate 2 and amplified, the current made to flow by the input signal given to the control-gate 2 is restricted by the second transistor to less than a certain limit. This results in a great increase in the distortion components in the amplifying signal.

To make the current of the second transistor unsaturable to current supplied from the first transistor in the sense of electrical circuitry, is also possible by appropriately choosing the potential of the screen-gate 3 when both transistors have exactly equal characteristics. However, in the case of an n-channel depletion type MOS transistor, for example, the potential of the screen-gate 3 is set at the potential of the source 1, or when operation is made with the source 1 set at a higher potential than the ground potential by means of the self-biasing system, the potential of the screen-gate 3 may be set at the ground potential lower than the source. This simplifies the use thereof and has a very great industrial merit. On the other hand, in a p-channel enhance type MOS transistor, the screen-gate 3 may be set at the potential equal to the control-gate 2 with many industrial advantages. To make such a usuage feasible, the current allowed to run in the second transistor is required to be greater than the current available in the first transistor at least under the condition where with equal voltage given between the source and island, and between the island and drain, the voltage of the control-gate relative to the source is equal to the voltage of the screen-gate relative to the island.

As is understood from the above description, the current allowed to run in the second transistor may be easily made greater than the current available in the first transistor by:

*a*. Setting $L$ of the second transistor smaller than $L$ of the first transistor;

*b*. Setting $W$ of the second transistor larger than $W$ of the first transistor; and

*c*. Varying $V_P$, thereby increasing the current in the second transistor.

Although alteration of $\mu$ is also effective, deliberately setting $\mu$ of the first transistor smaller than that of the second transistor, for example, is undesirable in view of high frequency characteristics and noise characteristics. Actual methods realizing the above conditions (*a*), (*b*) and (*c*) are as follows:

The condition (*a*) may be satisfied by making the distance $L$ of the second transistor smaller.

Regarding the condition (*b*), various electrode arrangements embodying this invention are illustrated in FIG. 2. In FIGS. 2 A to D, reference numeral 10 represents the source, 11 the control-gate, 12 the screen-gate, and 13 the drain. These diagrams are all for plan arrangements. When successively larger electrodes are arranged outwardly as shown in A, B and C, the island located under 11 and 12 and separated with an insulating film therefrom necessarily has a larger circumferential length than the innermost source. In the arrangement of FIG. 2 D, although each electrode is in rod shape, the source 10 is deliberately made smaller than other electrodes, smaller than the island located between 11 and 12 and separated with an insulating film therefrom. In all examples shown in FIG. 2, the positions for wire bonding to electrodes are omitted. If such bonding parts are provided, figures should be a little modified, but they are fundamentally the same. Configurations other than those shown in FIG. 2, such as elipse, rectangle, rhombus or any other shape, may be applicable.

The condition (*c*) is explained as following: In the n-channel MOS transistor using p-type Si, $V_P$ is usually negative. On the basis of experimental results, the following relationship exists:

$$V_P = k\ t_{ox}, \tag{2}$$

where $k$ is the proportionality constant, and $t_{ox}$ the thickness of the oxide film.

If the dielectric constant of the oxide film is represented by , and $I_{DS}$ is assumed to be $I_{DSS}$ when $V_G = O$, in introducing the equation (2) into the equation (1), the equation (1) turns to:

$$I_{DSS} = k^2\ \mu W t_{ox}/2L, \tag{3}$$

clarifying that the thicker the oxide film is the greater the current is in the range of $V_G > O$. On this ground, by using a thicker oxide film directly under the screen-gate than under the control-gate, the current allowed to flow through the second transistor may be made greater than the current available in the first transistor.

In the p-channel MOS transistor using n-type Si, when in the enhance mode, and the gate voltage is 0, the drain current does not flow, and the drain current grows by increasing $|V_G|$. In the latter type transistors, the way to make the current allowed to flow through the second transistor greater than the current available in the first transistor is to use a thinner oxide film on the screen-gate side.

Example 1

Figure 3:
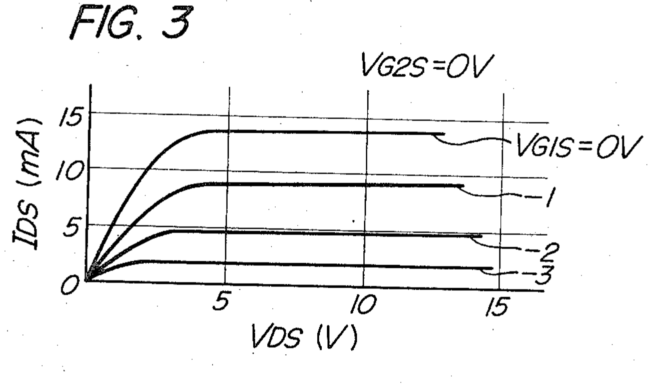
Figure 4:
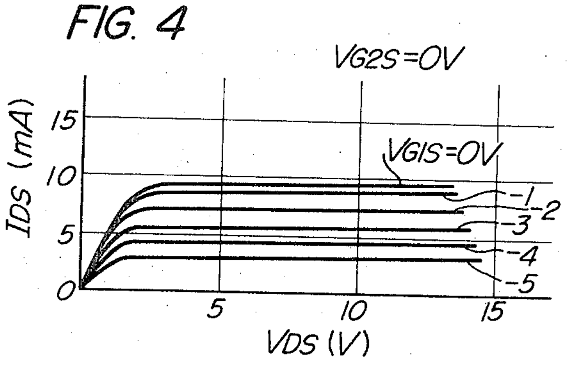
Figure 9:
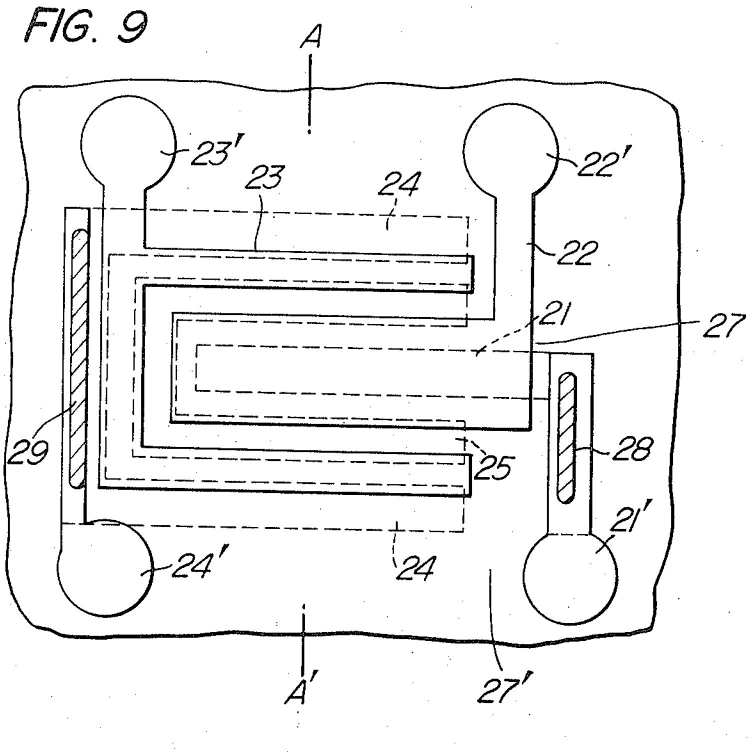
Figure 10:
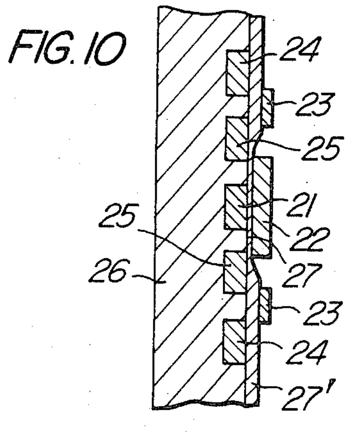
FIG. 10 is a cross-section taken along the line A–A′ of FIG. 9.

As shown in FIGS. 9 and 10, a p-type silicon substrate 26 with a resistivity 8Ω—cm was made into an insulated-gate field-effect transistor which has a comb shape electrode structure. The effective length of a side of a source 21 and that of a drain 24 are equal. The effective length of the side of the source 21 is set at 1.5 mm, the distance between the source 21 and an island 25 7$\mu$, the distance between the island 25 and the drain 24 7$\mu$, the thickness of the portion 27 of an oxide film on a control gate 22 1,000 A., and the thickness of the portion 27' of the oxide film on a screen gate 23 2,000 A. In FIG. 10, numerals 21', 22', 23' and 24' are respectively wire bonding parts of the source, control gate, screen-gate and the drain, while 28 and 29 are respectively connecting parts between the source 21 and the wire bonding part 21' and between the drain 24 and the wire bonding part 25'. The connections are made between $n^+$ diffused layers of the source, drain and the metallic films through openings formed in the oxide film. Typical $I_{DS} - V_{DS}$ characteristics of this device are as shown in FIG. 3. The same device but the source and drain being reversed, gave the characteristics shown in FIG. 4, where the curves for the drain current is thickly populated near 0 control-gate voltage $V_{G1S}$, whereas, the curves in FIG. 3 give no closely neighboring drain currents around $V_{G1S}$ =0 volts, showing the possibility of amplification without distortion. In both FIGS. 3 and 4, measurements were made the screen-gate voltage $V_{G2S}$ set at 0 volts. In this example, in providing the thickness difference in the oxide films of the two gates, the oxide film preliminarily grown to 2,000 A. by thermal oxidation was etched by the use of dilute hydrofluoric acid on the control-gate side with the screen-gate side covered with the photo resist.

Example 2

Figure 5:
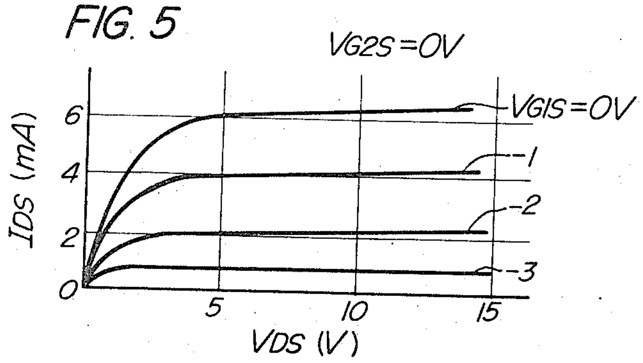
Figure 6:
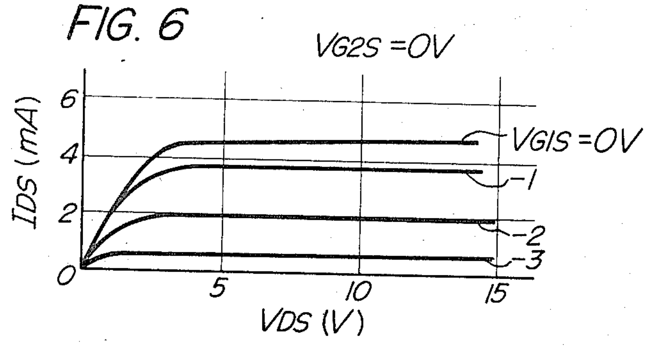

A p-type silicon with a resistivity of 2Ω—cm was made into a comb shape electrode structure of the same shape as the one in Example 1 in which both effective circumferential lengths of the source and drain were equal, and in which the effective circumferential length of the source was set at 1.5 mm, the distance between the source and island 15 $\mu$, the distance between the island and drain 5 $\mu$, and the thickness of the oxide film 1,000 A. A typical example of its characteristics is shown in FIG. 5. The typical characteristics in FIG. 6 are for the same device with the exception of the reversed source and drain. The drain current curves in FIG. 5 shown uniform change with the change of parameter $V_{G1S}$ in the neighborhood of $V_{G1S}$ = 0 volts, giving nearly an ideal result. In FIG. 6, however, around $V_{G1S}$ = 0 volts, the distribution of curves for different parameter $V_{G1S}$ values is crowded. In obtaining the data given in FIGS. 5 and 6, measurements were both made at 0 screen-gate voltage.

Example 3

Figure 2A:
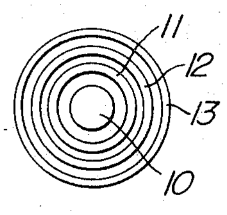
Figure 2B:
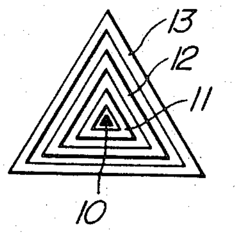
Figure 2C:
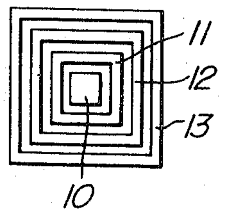
Figure 2D:
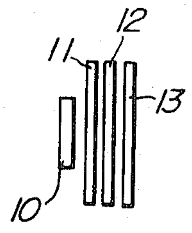
Figure 7:
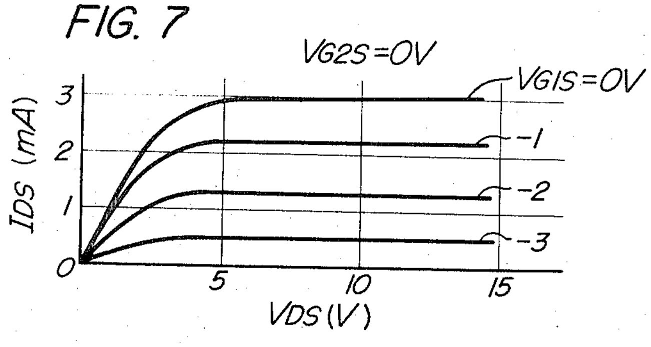
Figure 8:
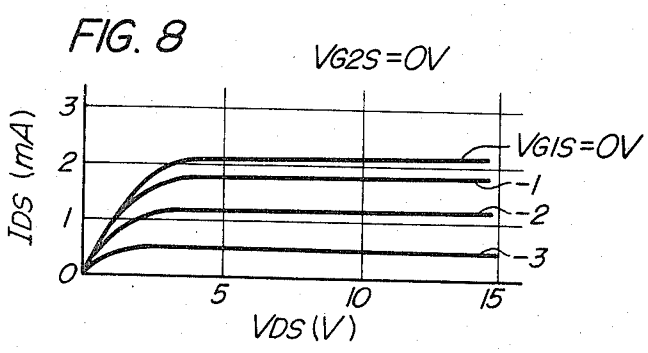

A p-type silicon with a resistivity of 2Ω—cm was made into a ring shape electrode structure as shown in FIG. 2A, in which the diameter of the source 10 was set at 150 $\mu$, the distance between the source and island 10 $\mu$, the radial width of the island 65 $\mu$, and the distance between the island and drain 10 $\mu$. In this example, the ratio of the circumferential length of the source to the circumferential length of the island is set at about two. The characteristics of the insulated-gate field-effect transistor composed in this way is shown in FIG. 7, and the same transistor except for the reversed position of the source and drain gave the characteristics shown in FIG. 8. In both cases, measurements were made with the screen-gate voltage set at 0 volts. Curves indicate better characteristics around $V_{G1S}$ = 0 volts in FIG. 7 than in FIG. 8.

While in each sample described above, the effect of altering the thickness of the oxide film was not specifically describe in detail, FIGS. 11 through 16 give cross-sections of various structures in which the thickness of oxide film is varied. Applicable plan forms are either ring, triangle, parallel arrangement, or other shapes.

Figure 11:
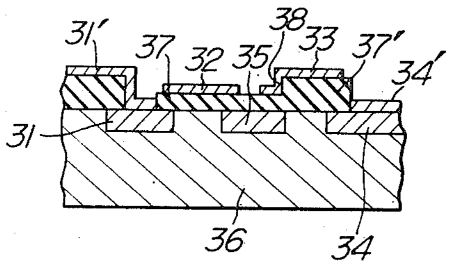
FIGS. 11 through 16 are cross-sectional views of the devices comprising various thickness of the oxide films exemplifying the devices of this invention.
Figure 14:
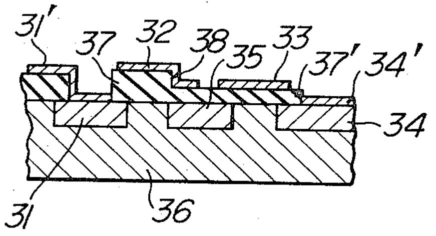
Figure 12:
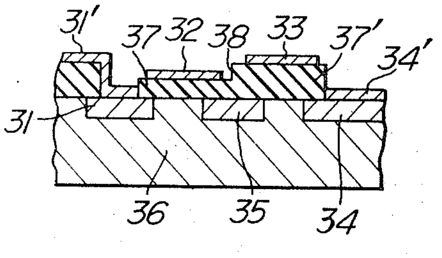
Figure 15:
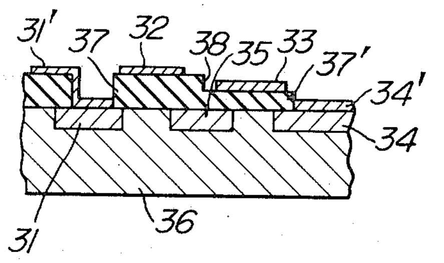
Figure 13:
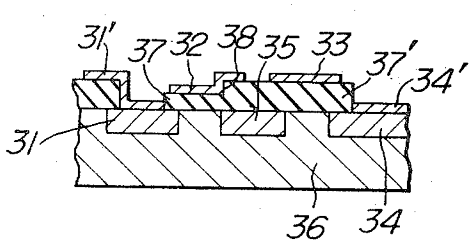
Figure 16:
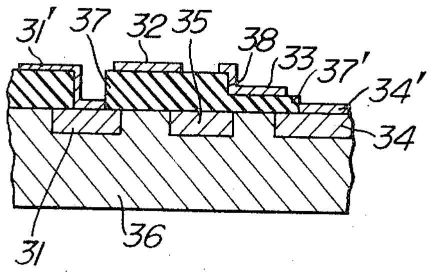

FIGS. 11 through 13 illustrate the n-channel types, and FIGS. 14 and 16 the p-channel types. In each Figure, 36 represents the semiconductor substrate, 31 the source, 34 the drain, 35 the island, 37 and 37' the oxide film parts with different thicknesses respectively on the side near the source and on the side near the drain, 38 the stepped parts of oxide film on both parts mentioned above, 31' the lead out electrode of the source, 32 the control-gate, 33 the screen-gate, and 34' the lead-out electrode of the drain. In FIG. 11, the stepped part 38 is located at the drain side end of the island 35. In FIG. 12, the stepped part 38 is provided about the center of the island 35. This type does not use the gate electrode at the position where the stepped part is located, and, therefore, some allowance is available in that place with facility in manufacturing. In FIG. 13, the stepped part 38 is provided at the source side end of the island 35. This type has smaller capacities of both the control-gate and screen-gate as compared with those of the embodiment shown in FIG. 11, giving better high frequency characteristics. In the p-channel type shown in FIGS. 14 through 16, the thicknesses of the oxide films 37 and 37' and the positions of the stepped parts located therebetween relative to the source 31 and the drain 34 are reversed to those shown in FIGS. 11–13. With respect to their characteristics, FIG. 14 corresponds to FIG. 11, FIG. 15 to FIG. 12, and FIG. 16 to FIG. 13, respectively.

In the embodiments described above, the thickness of the oxide films provided on the two gates, the distance between the source and island, the distance between the island and drain, and the source length and the island length, are respectively differentiated to show their respective effects. It is also practicable to combine two or more characteristics of them with resultant added effects. The number of gates is not necessarily limited to two, but three or four gates can be used. As a semiconductor material, not only silicon, but germanium, gallium arsenide, cadmium sulfide, cadmium telluride, etc., may be employed as well. $SiO_2$, SiO, magnesium fluoride, silicon nitride, etc., can be used as an insulating film.

What is claimed is:

1. A p-channel insulated-gate field-effect transistor comprising an insulator film on a semiconductor substrate, a source and a drain electrode regions having opposite conductivity type to the main part of said substrate, at least two gate electrodes mutually independently located on said insulator film, and at least one island region having the same conductivity type as said source and said drain electrode regions and existing directly below each respective gap between said gates and on the underside of said insulating film, said gates being located correspondingly between said source region, drain region, and island region respectively, said insulator film successively decreasing in its thickness in the direction from said source electrode to said drain electrode.

2. A compound channel insulated gate triode comprising first, second and third spaced diffused regions in a semiconductor substrate forming first, second and third terminals respectively, first enhancement mode channel between the first and second diffused regions and a second enhancement mode channel between the second and third diffused regions and electrically common gate electrodes overlying both channels and separated from the first and second channels by first and second insulating layers respectively, the first channel having a greater transconductance than the second channel at a given gate voltage, said greater transconductance being produced by the width to length ratio of the first channel being greater than the width to length ratio of the second channel.

3. An insulated gate triode as defined in claim 2 wherein the width of the first channel is greater than the width of the second channel to produce the greater transconductance.

4. An insulated gate triode as defined in claim 2 wherein the length of the second channel is greater than the length of the first channel to produce the greater transconductance of the first channel.

5. A compound channel insulated gate triode comprising first and second enhancement mode channels formed on a common substrate, each channel having a drain and a source end and a control gate separated from the channel by an insulating layer, the first channel having a greater transconductance than the second channel at a given gate bias, said greater transconductance being produced by the width to length ratio of the first channel being greater than the width to length ratio of the second channel, the drain of the first channel being the drain of the triode, the source of the first channel being electrically common with the drain of the second channel, the source of the second channel being the source of the triode, and the control gates of the first and second channels being common.

6. An insulated gate triode as defined in claim 5 wherein the width of the first channel is greater than the width of the second channel to produce the greater transconductance.

7. An insulated gate triode as defined in claim 5 wherein the length of the second channel is greater than the length of the first channel to produce the greater transconductance of the first channel.

* * * * *

UNITED STATES PATENT OFFICE
CERTIFICATE OF CORRECTION

Patent No. 3,786,319 Dated January 15, 1974

Inventor(s) Tomisaburo Okumura

It is certified that error appears in the above-identified patent and that said Letters Patent are hereby corrected as shown below:

[75] Inventor: Tomisaburo Okumura, Kyoto, Japan

Signed and sealed this 23rd day of July 1974.

(SEAL)
Attest:

McCOY M. GIBSON, JR.
Attesting Officer

C. MARSHALL DANN
Commissioner of Patents